US005188017A

United States Patent [19]

Grant et al.

[11] Patent Number: 5,188,017

[45] Date of Patent: Feb. 23, 1993

[54] NATURAL GAS CYLINDER FITTING AND SOLENOID VALVE

[75] Inventors: Michael D. Grant, Toronto; Michael A. Treymayne, Newmarket, both of Canada

[73] Assignee: The Consumers' Gas Company, Ltd., Toronto, Canada

[21] Appl. No.: 717,043

[22] Filed: Jun. 18, 1991

[51] Int. Cl.[5] .................... F15B 13/044; F16K 31/02; F16K 35/00

[52] U.S. Cl. .................................... 91/459; 251/30.04; 251/129.19; 251/129.21; 251/332; 251/900; 137/630.15

[58] Field of Search ............ 91/459; 251/30.03, 30.04, 251/129.19, 129.21, 900, 332; 137/630.15

[56] References Cited

U.S. PATENT DOCUMENTS

| | | | |
|---|---|---|---|
| 1,980,063 | 11/1934 | Jensen | 251/144 |
| 2,574,054 | 11/1951 | Miller | 251/900 X |
| 2,727,715 | 12/1955 | Tuthill | 251/144 X |
| 2,959,188 | 11/1960 | Kepner | 251/332 X |
| 3,405,906 | 10/1968 | Keller | 251/30.04 |
| 4,015,815 | 4/1977 | Leisner et al. | 251/332 X |
| 4,274,444 | 6/1981 | Ruyak | 137/630.15 X |
| 4,541,610 | 9/1985 | Reynolds et al. | 251/129.21 |
| 4,543,983 | 10/1985 | Pauliukonis | 251/129.19 X |
| 4,556,085 | 12/1985 | Warrick | 251/129.21 X |
| 4,621,788 | 11/1986 | DeLew et al. | 251/129.21 X |
| 5,048,790 | 9/1991 | Wells | 251/30.04 |

FOREIGN PATENT DOCUMENTS

| | | | |
|---|---|---|---|
| 566211 | 12/1944 | United Kingdom | 251/129.21 |

*Primary Examiner*—Edward K. Look
*Assistant Examiner*—John Ryznic
*Attorney, Agent, or Firm*—Ridout & Maybee

[57] ABSTRACT

A natural gas cylinder fitting and solenoid valve includes a solenoid-actuated poppet co-operating with an O-ring clamped to the floor of the valve cavity to selectively prevent or permit the passage of gas between a gas line and a natural gas cylinder. In an internally mounted embodiment, a fitting body adapted to be engaged in the neck of a cylinder isolates a low pressure region containing the electrical components of the solenoid.

15 Claims, 7 Drawing Sheets

NATURAL GAS CYLINDER FITTING AND SOLENOID VALVE

FIELD OF THE INVENTION

This invention relates to gas valves for pressure cylinders. In particular, this invention relates to an improved solenoid valve for controlling the flow of gas into and out of a natural gas cylinder in a natural gas powered motor vehicle.

BACKGROUND OF THE INVENTION

Natural gas provides a cost efficient and environmentally friendly alternative to gasoline as a fuel for combustion engines, particularly in motor vehicles. Thousands of motor vehicles have already been successfully converted to utilize natural gas as a fuel source instead of, or as an alternative to, gasoline. However, the use of natural gas as a fuel in motor vehicles present problems which are not encountered in gasoline powered motor vehicles.

Many of these problems arise because at environmental temperatures gasoline is a liquid, while natural gas, which consists primarily of methane, is gaseous. Thus, natural gas must be stored under high pressure in fuel cylinders specifically designed for motor vehicle use.

This gives rise to a number of requirements, most of which are safety-related:

1. It is essential that the high pressure gas be contained within the cylinder when the vehicle engine is not running. Over time, even minor leakage from the cylinder, particularly in an enclosed space such as a garage, can pose a considerable explosion hazard.
2. The flow of gas into and out of the cylinder must be carefully controlled. Unlike a typical gasoline tank, which has a separate inlet and outlet, to minimize the potential for leakage a natural gas cylinder should preferably have only a single opening acting as both inlet and outlet. Cost considerations, particularly as an inducement to conversion from gasoline to natural gas usage, render it advantageous to utilize a single valve to control the flow of gas both into and out of the cylinder. However, a valve which is capable of permitting a controlled flow of gas out of the cylinder, under the high pressure conditions within the cylinder, must also be capable of withstanding the extremely high pressure reverse flow conditions that arise when gas is injected into the cylinder during filling. Known bidirectional valve designs are unsuitable for this application because the extremely high rate of gas flow through the cylinder opening, especially in filling but also in use, tends to cause sudden dislodgement of the sealing means (usually a gasket) used in such valves.
3. Because of the nature of motor vehicles and their intended use, provision must be made to ensure that in case of collision the flow of gas out of the cylinder is immediately and completely interrupted. Furthermore, where means are provided for permitting the alternate use of natural gas and gasoline (or another fuel) in a motor vehicle engine, it is necessary to ensure that there is no flow of natural gas out of the cylinder when the engine is operating on gasoline or any other alternate fuel source.

In conventional natural gas vehicles there has been provided a solenoid valve or like means, and a check valve, each permitting only unidirectional gas flow. A solenoid valve provided at the inlet to the engine regulator controls the flow of gas from the cylinder into the engine. A check valve provided in a filling receptacle permits only the injection of gas into the cylinder. Although high standards must be maintained in order to ensure safety, the design of each check valve can be relatively simple because only a unidirectional flow of gas is required. The provision of both valves adds to both the cost of both installing original equipment and installing a conversion kit into a gasoline powered vehicle, and the cost of the equipment or conversion kit itself, and requires that many conduits and components outside of the cylinder be continuously under the high pressure conditions that exist within the cylinder.

For example, known natural gas vehicle cylinder valves utilize a manually operated screw thread actuator to control the flow of gas into and out of the cylinder for servicing or in case of an emergency. Manual valves tend to be kept open to permit easy refuelling and operation of the vehicle, with the result that the entire gas fuel system branching from the cylinder opening to the fuel lockoff solenoid valve at the regulator inlet, and to the filling receptacle, is continuously exposed to cylinder pressure. The potential for leakage, particularly in case of collision, can be significantly reduced by regulating the flow of gas at, or preferably inside, the cylinder opening.

The present invention overcomes these disadvantages by providing a cylinder fitting having a bidirectional solenoid valve fitted directly to the opening in the cylinder. The solenoid valve is adapted to both permit the injection of gas into the cylinder during filling and regulate the flow of gas out of the cylinder during operation of the vehicle.

In one embodiment of the cylinder fitting the solenoid valve is externally mounted. The cylinder fitting is adapted to be retrofitted to existing natural gas cylinders, and will replace (or render redundant) the fuel lockoff solenoid valve at the regulator inlet and the manual valve at the cylinder opening.

In a further embodiment of the cylinder fitting the solenoid valve is mounted inside the cylinder, thus protecting the valve from breakage and failure in case of a collision. The solenoid coil is contained within a low pressure chamber formed inside the cylinder by the cylinder fitting, effectively isolating the electrical components of the solenoid valve from the combustible gas within the cylinder and thereby permitting easy access for power supply lines.

These and other advantages will be apparent in the description of the present invention which follows.

SUMMARY OF THE INVENTION

The present invention thus provides a cylinder fitting having a valve body comprising a valve cavity, means for connecting the valve body to a gas cylinder including a passage in communication with the valve cavity, and means for connecting a gas line in communication with the valve cavity, sealing means engaged against a floor of the valve cavity, and a solenoid-actuated poppet co-operating with the sealing means to selectively prevent or permit gas to flow between the valve cavity and the gas line.

The present invention further provides a cylinder fitting having a fitting body having an inner end and an outer end, a main plug sealing the outer end of the fitting body having a valve cavity in communication with a port for connecting a gas line, a solenoid body having an outer end seated in the valve cavity and an inner end in gas-tight engagement with an opening in the inner end of the fitting body, whereby the fitting body, main plug and solenoid body define a low pressure region containing a solenoid coil surrounding the solenoid body, sealing means engaged against a floor of the valve cavity, a solenoid-actuated poppet co-operating with the sealing means to selectively prevent or permit gas to flow between the valve cavity and the gas line.

The present invention further provides a cylinder fitting having a fitting body having an inner end and an outer end with means for connecting a gas line, a gas tight plug sealing the inner end of the fitting body, a solenoid body having an outer end seated in a valve cavity formed in the outer end of the fitting body, whereby the fitting body and the fitting plug define a low pressure region containing a solenoid coil surrounding the solenoid body, at least one passageway extending radially through the fitting body and in communication with the valve cavity and a high pressure region within the cylinder, sealing means engaged against a floor of the valve cavity, and a solenoid-actuated poppet co-operating with the sealing means to selectively prevent or permit gas to flow between the valve cavity and the gas line.

BRIEF DESCRIPTION OF THE DRAWINGS

In drawings which illustrate by way of example only preferred embodiments of the present invention.

DETAILED DESCRIPTION OF THE INVENTION

Figure 1:
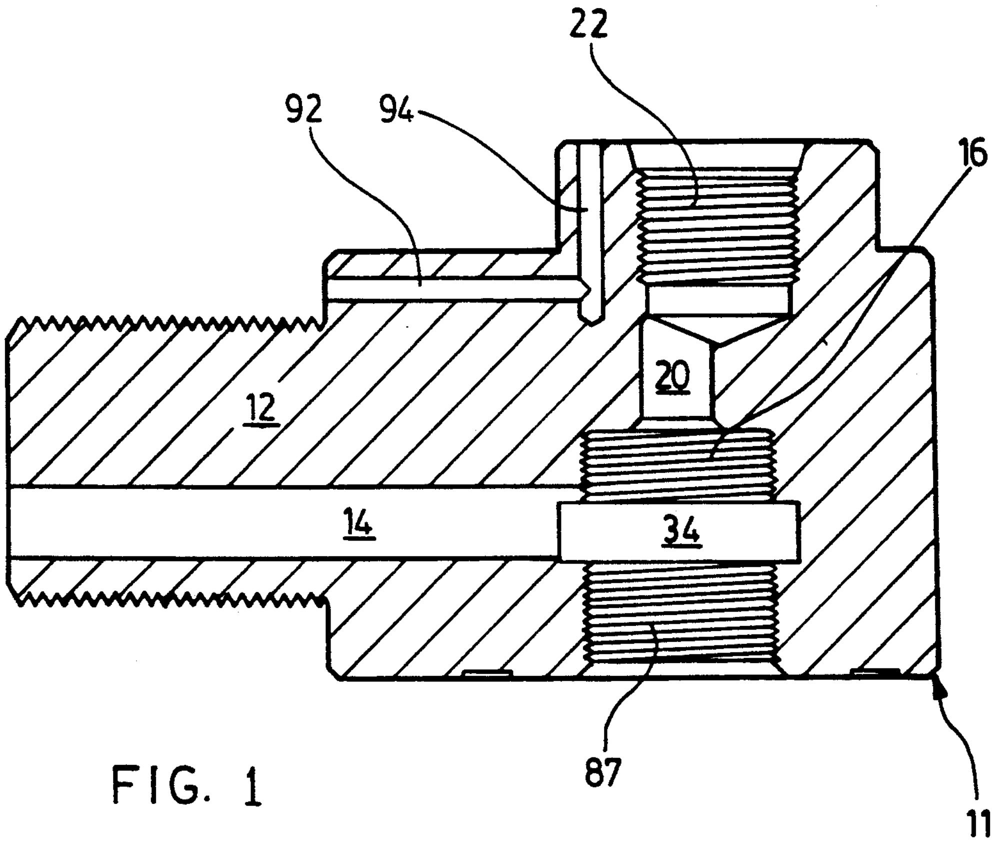
FIG. 1 is a cross-sectional view of a valve body for a first embodiment of the present invention.
Figure 3:
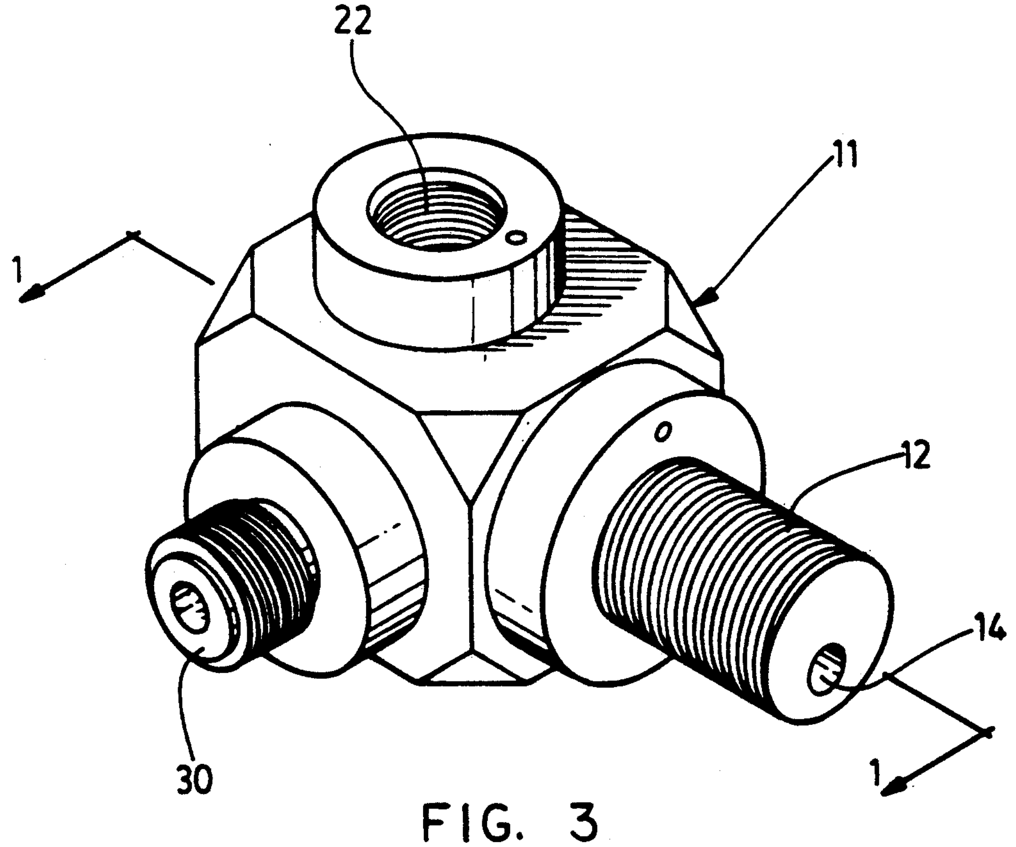
FIG. 3 is a perspective view of the cylinder fitting of FIG. 2.

In a first preferred embodiment of the present invention, having an externally mounted solenoid valve, the cylinder fitting 10 comprises a metallic valve body 11, illustrated in FIG. 1, provided with a threaded nipple 12 sealingly coupled to the threaded opening in the neck of a natural gas cylinder 2. A passage 14 extends through the nipple 12 to a chamber 34 in communication with a threaded cylindrical valve cavity 16. The valve cavity 16 is provided with a floor 18 opening into a passage 20 in communication with a threaded port 22 for gas-tight engagement with a conventional coupling from a gas line (not shown). A fitting 30 for a conventional pressure release device (not shown) is in communication with the chamber 34, as shown in FIG. 3.

A boot 90 encircles the valve body 11 in a gas-tight fit against both the valve body 11 and the shoulder of the cylinder 2. In case of leakage of gas around the nipple 12, the gas will be vented through passages 92, 94 out of the valve body 11 to the environment; if the cylinder 2 is mounted within the vehicle preferably leakage gas is vented to the exterior of the vehicle in known fashion.

Figure 2:
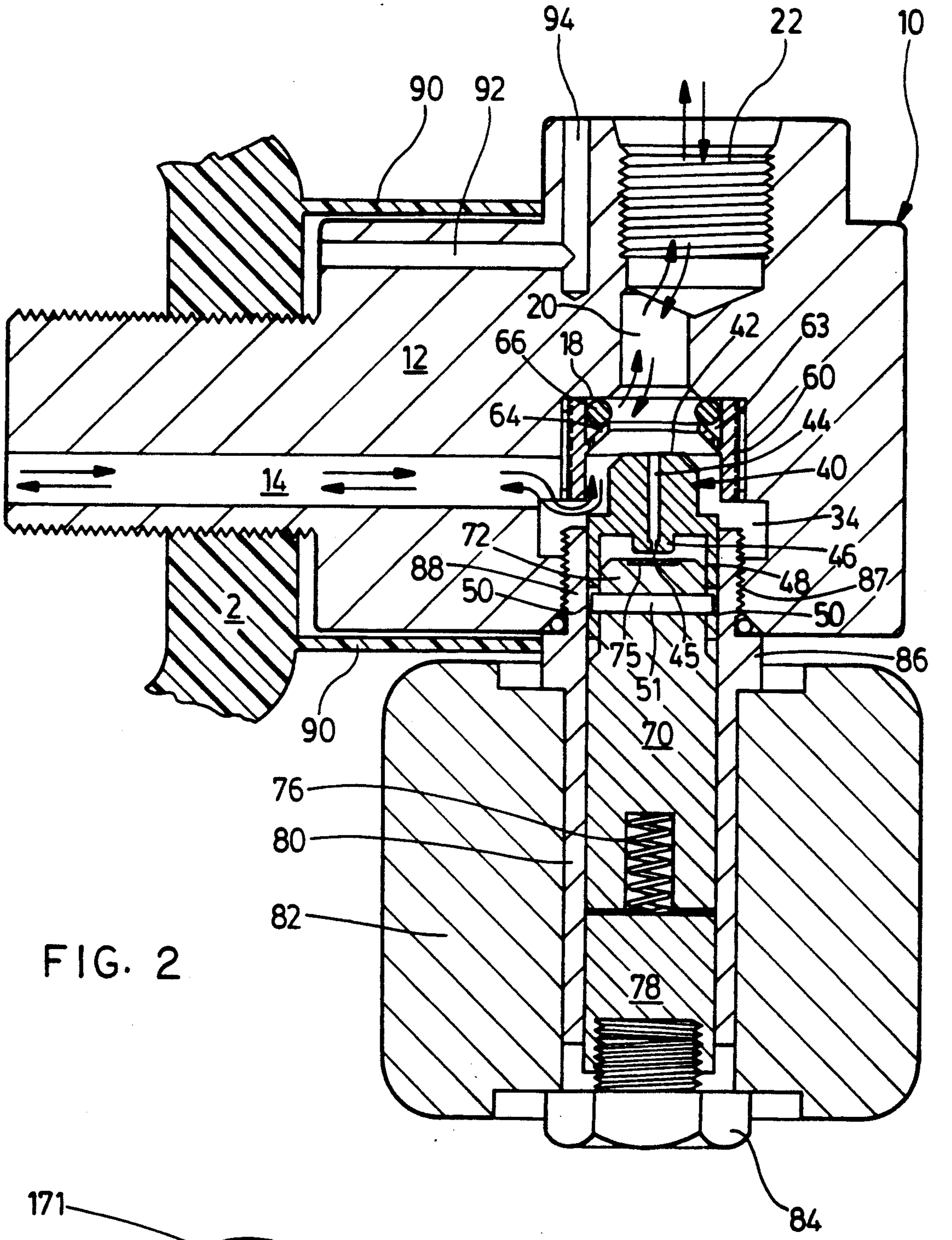
FIG. 2 is a cross-sectional view of the cylinder fitting for the first embodiment of the present invention.

The assembled cylinder fitting 10 is illustrated in FIG. 2. Apart from the gaskets and boot 90, all components are metallic. The valve assembly, shown in exploded view in FIG. 4, includes a poppet 40 having a chamfered or convex cylindrical head 42 provided with a bleed hole 44 extending axially through the poppet head 42 to a chamfered boss 46 contained within a cylindrical poppet body 48. The poppet body 48 is provided with holes 50 for reasons which will be described below.

Figure 2A:
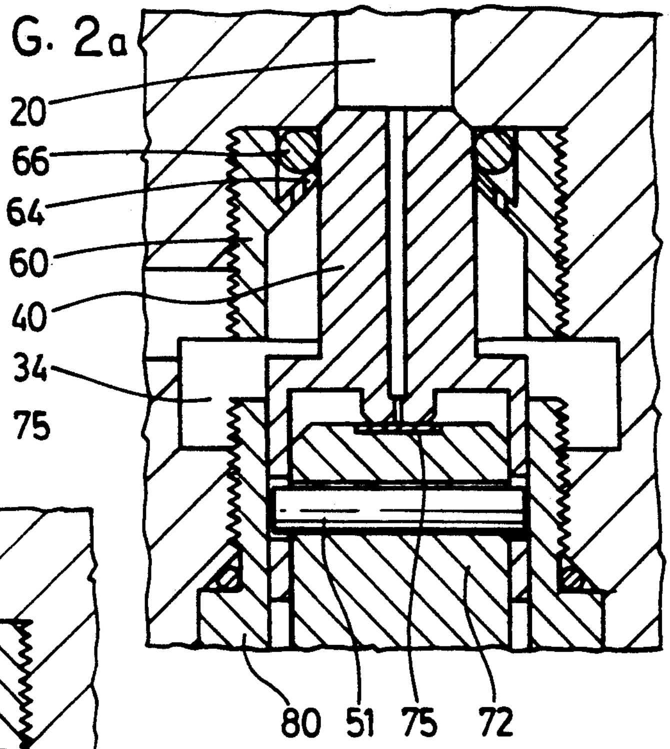
FIG. 2*a* is a partial section showing the valve in fully closed position.
Figure 4:
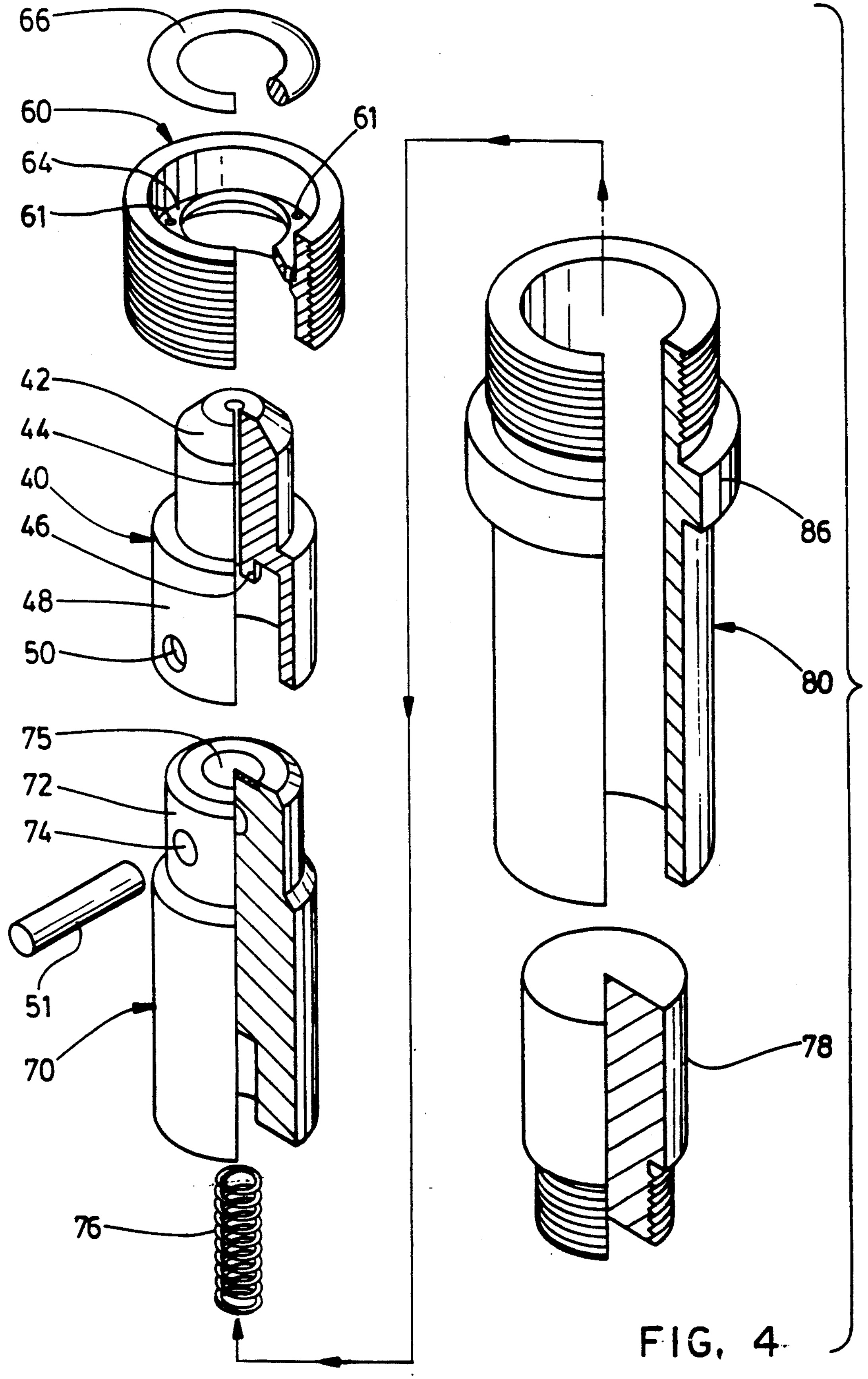
FIG. 4 is an exploded view of the solenoid, poppet and core assembly for the cylinder fitting of FIG. 2.

The head 42 of the poppet 40 projects into a collar 60 having a cylindrical body 62 and an inner oblique annular flange 64. The collar 60 has a threaded exterior wall to engage the wall of the valve cavity 16. A gasket 66, preferably an elastomeric O-ring composed of a natural gas-resistant elastomer such as VITON™, is fitted within the collar 60, as illustrated in FIG. 4, such that when the collar 60 is engaged in the valve cavity 16 the gasket 66 is snugly clamped between the annular flange 64 and the floor 18 of the valve cavity 16. When the head 42 of the poppet 40 is seated against the bevelled entrance to passage 20, the gasket 66 cooperates with the side wall of the head 42 of the poppet 40 to provide a high pressure seal between the passage 20 and the valve cavity 16, as shown in FIG. 2*a*. It will thus be apparent that the gasket 66 must have a thickness greater than the radial extent of the annular flange 64, so that the head 42 of the poppet 40 will engage the gasket 66 when the valve is closed, while sufficient clearance is left between the head 42 of the poppet 40 and the annular flange 64 to permit free axial movement of the poppet 40 within the collar 60.

While deformation of the gasket 66 is undesirable, a snug fit against the floor 18 of the valve cavity 16 is essential to prevent dislodgement of the gasket 66 during operation of the motor vehicle, and particularly under the extremely high flow-rate conditions encountered during refilling. The collar 60 and flange 64 should therefore be machined to provide a precise fit, to ensure that the gasket 66 is adequately secured but not deformed by the compressive force exerted by the flange 64.

The annular flange 64 is preferably provided with a pair of small holes 61 such that an annular space 63, formed between a surface of the gasket 66, a portion of the interior wall of the collar 60 and the acute face of the flange 64, is in communication with the gas within the cylinder 2. This pressurizes the annular space 63 and forces the gasket 66 against the head 42 of the poppet 40 when the valve is closed, to ensure a tight seal.

The poppet 40 is actuated by a solenoid comprising a tubular core 70 slidably disposed in a tubular solenoid body 80. The solenoid core 70 includes a constriction forming a head 72 slidably engaged within the cylindrical poppet body 48, which extends into the inner end of the solenoid body 80. The head 72 of the solenoid core 70 is provided with a radial bore 74 containing a pin 51, smaller than but in alignment with the holes 50 in the poppet body 48, for engaging the poppet 48 as described below. The head 72 of the solenoid core 70 further includes a central recess provided with a gasket 75 for sealing off the bleed port 45 in the poppet 40 when the valve is closed.

A spring 76 biases the solenoid core 70, and thus the poppet 40, to the closed position. The compressive force of the spring 76 is resisted by a solenoid plug 78 threaded, welded or soldered into and extending from the outer end of the solenoid body 80. The depth of the solenoid plug 78 may be adjusted to increase or decrease the compressive force of the spring 76 on the core 70, to ensure proper sealing of the valve. In FIG. 2, the valve is illustrated in the fully open position.

The solenoid coil 82 comprises a 16 watt, 12 volt coil of conventional design, surrounding the solenoid body 80 and retained by a retaining nut 84 engaged over a threaded outer end of the solenoid plug 78. The solenoid body 80 is provided with a flange 86 and a threaded inner end 88 coupled to the solenoid receptacle port 87 in the valve body 11 in a gas-tight fit. Preferably a gasket 89, such as an elastomeric O-ring, is engaged between the flange 86 and a bevelled edge of the solenoid receptacle port 87 to prevent leakage of gas. The flange 86 further serves to retain the solenoid coil 82.

To put the cylinder fitting 10 into use, the fitting 10 is coupled to the opening 4 of a natural gas fuel cylinder 2. A gas line (not shown) is provided with a threaded coupling 24 coupled to the port 22. The other end of the gas line is provided with a "T" connector. One branch of the "T" connector is connected to the engine regulator, and the other branch of the "T" connector is connected to a filling receptacle of conventional design, which is provided with a check valve, or to a manifold in multi-cylinder vehicles.

To fill the cylinder, a filling nozzle is coupled to the filling receptacle, and a manual valve on the nozzle is opened. Gas flows through the gas line to the port 22 of the cylinder fitting 10 (when the engine is off, the regulator does not permit any flow of gas to the engine) and through the passage 20. The filling pressure far exceeds the pressure inside the cylinder 2, and the pressure differential forces the poppet 40 and solenoid core 70 further into the solenoid body 80, thus forcing gas through the collar 60, into the chamber 34 and through the passage 14 into the cylinder 2. Once the cylinder 2 has been filled, generally determined by the pressure of gas in the cylinder 2, the attendant closes the valve on the filling nozzle, which equalizes the pressure across the solenoid valve. The spring 76 immediately forces the solenoid core 70 against the boss 46, which closes the bleed port 45 and forces the head 42 of the poppet 40 against the gasket 66 to close the valve.

When the engine starter is engaged, the solenoid is switched on to open the valve. The pressure differential across the valve is large, and therefore to keep the size of the solenoid coil 82 within reasonable limits the solenoid opens the valve in two stages. The solenoid coil 82 first retracts the solenoid core 70, thus opening the bleed port 45, until a pin 51 extending through the bore 74 in the head 72 of the solenoid core 70 engages the edges of holes 50. The pressure differential across the valve momentarily prevents the solenoid coil 82 (which has a limited retracting force) from further retracting the solenoid core 70. Gas begins to flow through the bleed hole 44, reducing the pressure differential across the valve. With the reduction in pressure differential, resistance against the solenoid decreases to the point where the solenoid coil 82 has sufficient force to fully retract the solenoid core 70, which unseats the poppet 40 and permits full gas flow out of the passage 20 and port 22 into the gas line.

Figure 2B:
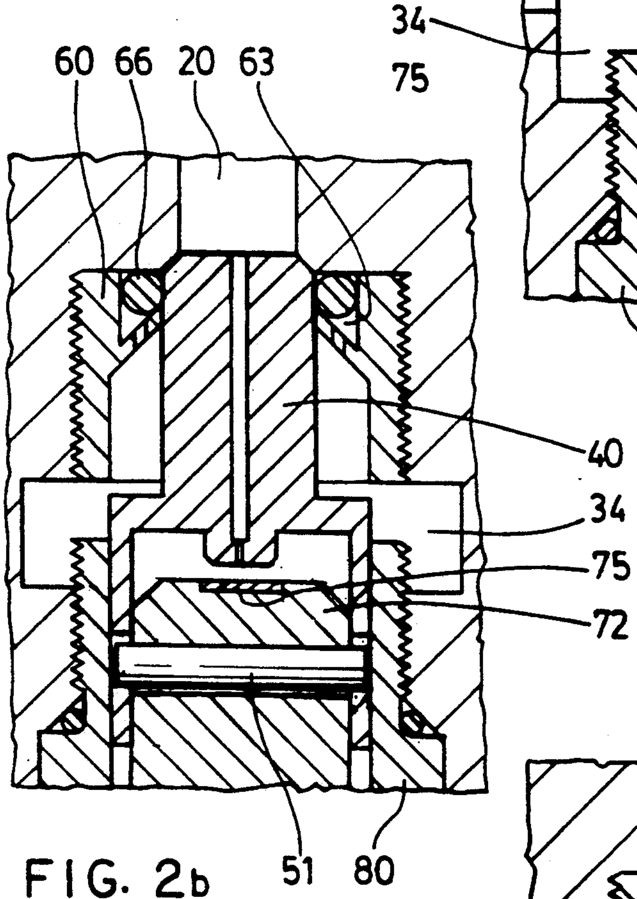
FIG. 2*b* is a partial section showing the valve in a bleed position.
Figure 2C:
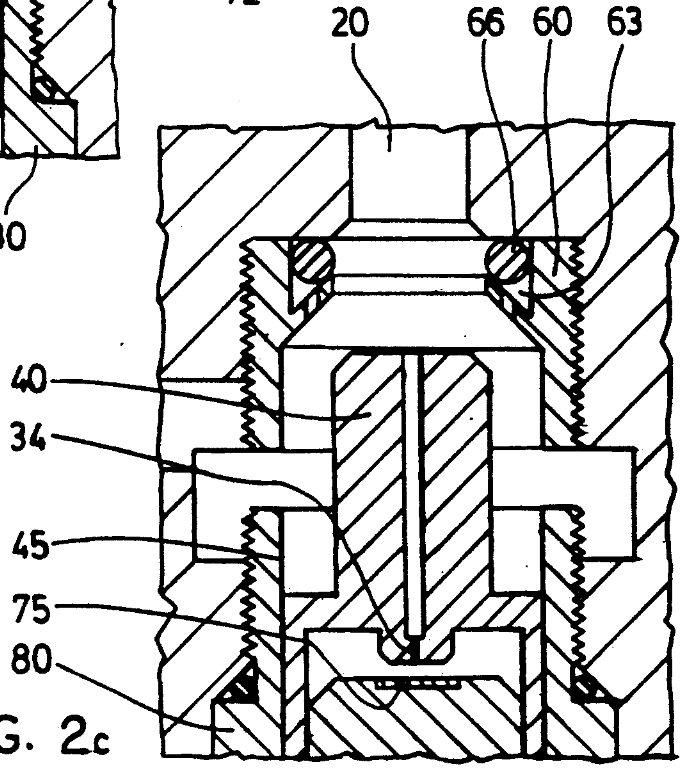
FIG. 2*c* is a partial section showing the valve in a fully open position.

The two-stage opening process is illustrated in FIGS. 2*a*–2*c*. FIG. 2*a* illustrates the fully closed position of the valve. In FIG. 2*b*, the solenoid core 70 is retracted, opening the bleed port 45, while the poppet 40 remains seated. In FIG. 2*c*, the valve is shown in the fully open position.

The path of gas flow in both directions is illustrated by arrows in FIG. 2.

Figure 5:
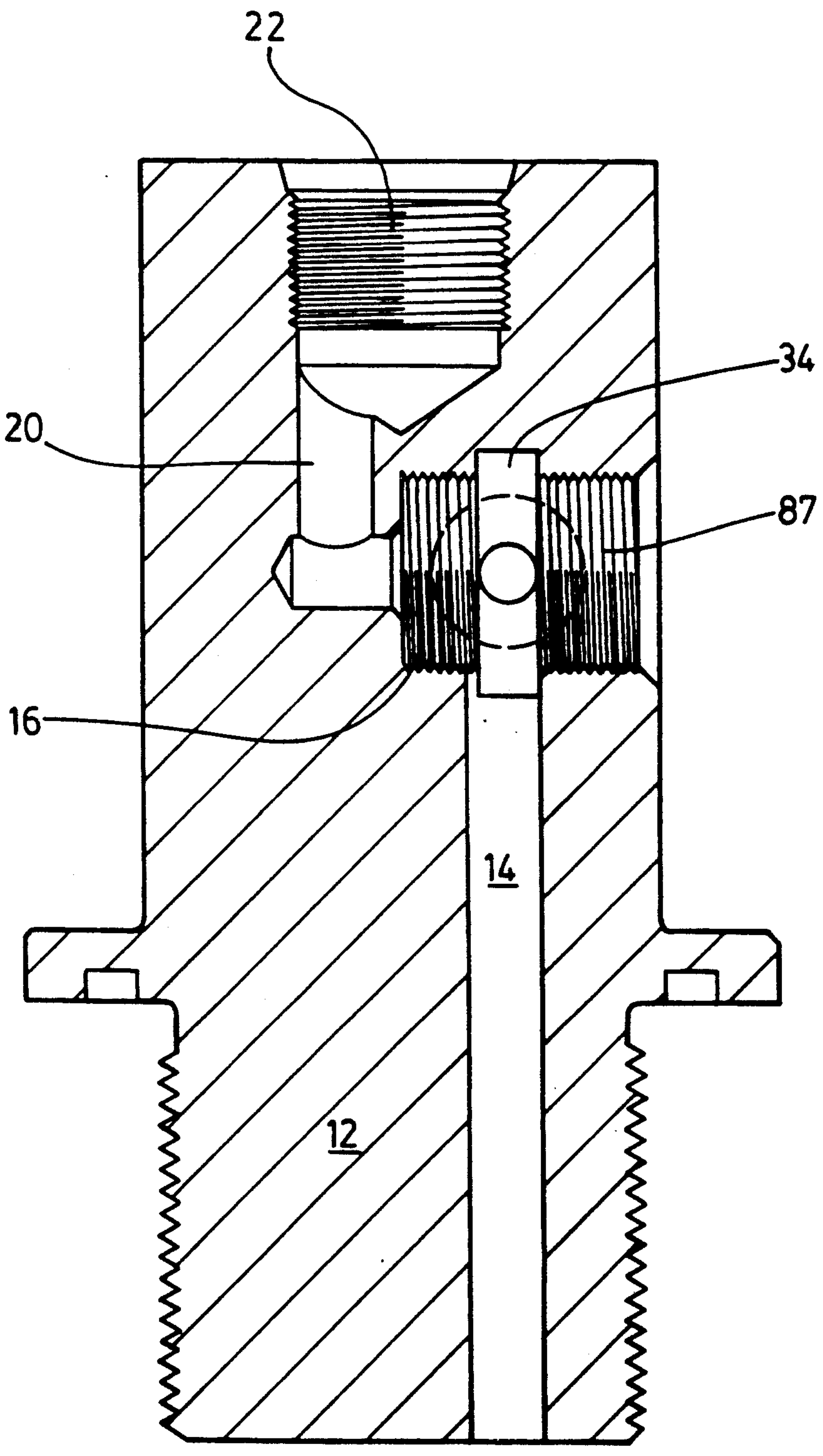
FIG. 5 is a cross-sectional view of a modification of the first embodiment of the present invention for heavy duty applications.

A modification of the valve body 11 in a cylinder fitting 10 for heavy duty applications such as buses and the like, which require a relatively high gas flow in operation, is illustrated in FIG. 5. The above description applies in similar fashion to this modification, with like numerals designating corresponding components.

Figure 6A:
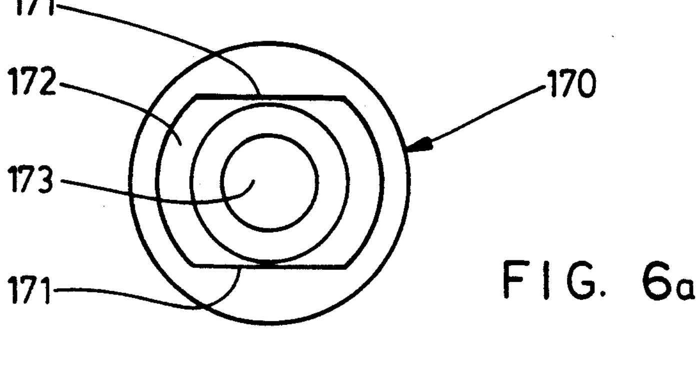
FIG. 6*a* is an end view of the solenoid core illustrated in FIG. 6.
Figure 6:
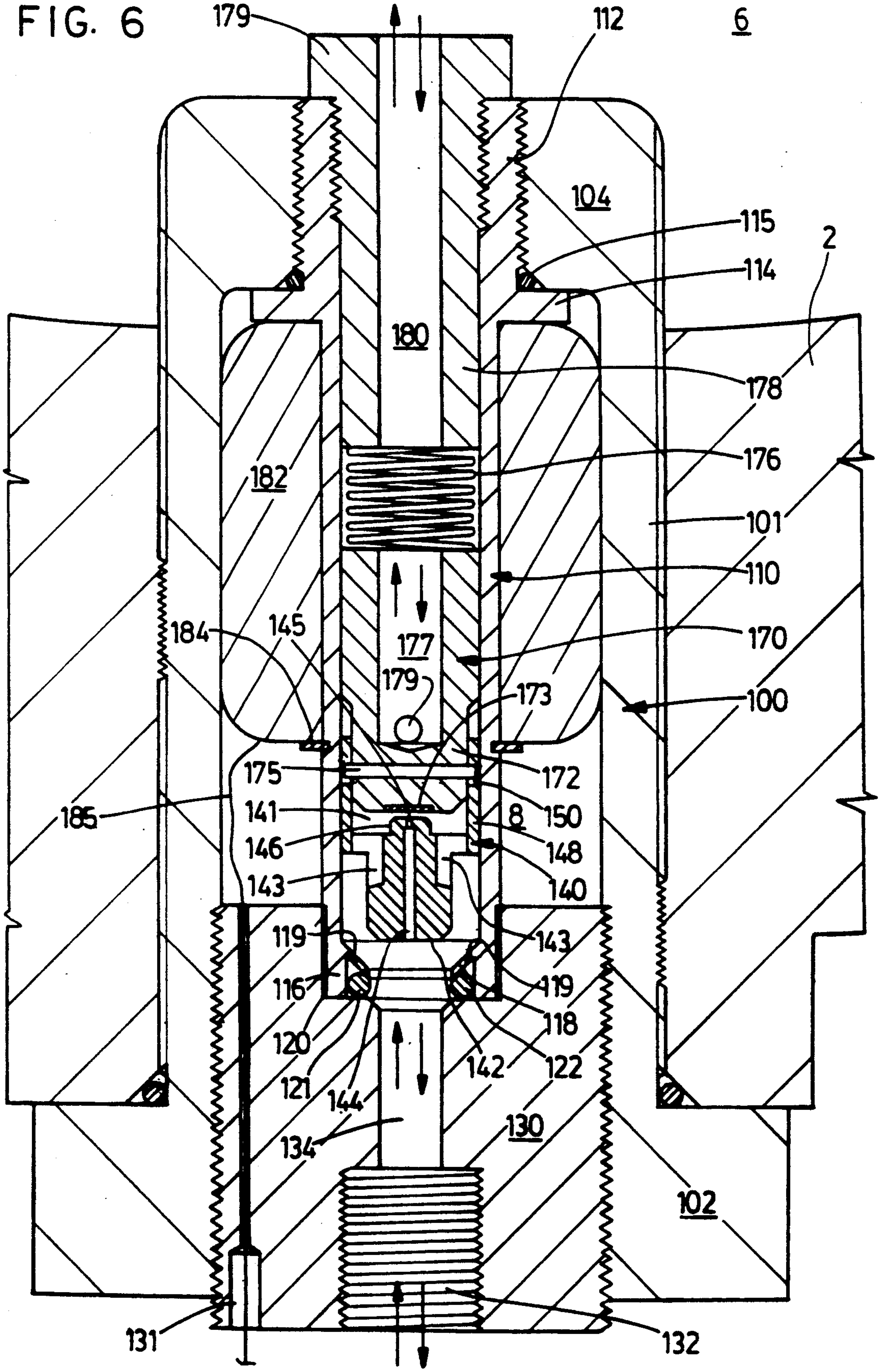
FIG. 6 is a cross-sectional view of a second embodiment of the present invention for mounting inside a cylinder.

In a further preferred embodiment of the present invention, illustrated in FIG. 6, the entire valve assembly is mounted inside the cylinder 2. A cylinder fitting 100 comprises a threaded cylindrical body 101 having an outer lip 102. The cylinder fitting 100 contains a tubular solenoid body 110 having a threaded inner end 112 coupled to an opening 104 in the inner end of the fitting body 101, and a flange 114 adapted to engage a gasket 115 against the inner end 112 of the fitting body 101 for a gas-tight fit. The outer end 116 of the solenoid body 110 is also threaded, seated in a threaded cylindrical valve cavity 120 formed as a recess in a main plug 130. The plug 130 is engaged in the outer end of the fitting body 101, and includes a passage 134 in communication with the valve cavity 120, leading to a port 132 for coupling a gas line (not shown). This effectively creates a low pressure region 8 defined by the fitting body 101, the main plug 130 and the solenoid body 110, which contains the electrical components of the solenoid.

An oblique annular flange 118 having a pair of holes 119, formed or welded inside the solenoid body 110 functions, as in the above-described embodiment, to clamp a gasket 122 such as an O-ring against the floor 121 of the valve cavity 120. Compression of the gasket 122 is controlled by the depth of the annular flange 118 in the solenoid body 110, which should thus be precisely configured to snugly retain the gasket 122.

The cylindrical poppet 140 is configured according to the above-described embodiment, including a chamfered or convex head 142 adapted to seat against the gasket 122, a bleed hole 144 extending through an annular boss 146 containing the bleed port 145, and a cylindrical poppet body 148 slidably extending into the solenoid body 110 and including holes 150. The solenoid core 170 includes a constriction forming a head 172 slidably extending into the poppet body 148 and having a radial bore 174 with a pin 175 extending therethrough to engage the holes 150 in the poppet body 148 in the two-step valve opening procedure described above. In FIG. 6 the valve is illustrated in the fully open position.

The poppet 140 in this embodiment is provided with orifices 143 permitting gas to flow between the valve cavity 120 and the space 141 formed inside the poppet body 148. A central axial bore 177 through the solenoid core 170 is provided with an opening 179 in communication with the space 141 through flat surfaces 171 or slots formed axially along the head 172, as shown in FIG. 6*a*, to permit gas to flow through the central bore 177 when the valve is open.

The poppet 140 is biased to the closed position by a compression spring 176 compressively engaging the solenoid core 170. The compressive force of the spring 176 is resisted by a solenoid plug 178 provided with a threaded portion 111 to engage the interior end 112 of the solenoid body 110. A flange 179 permits the plug to be securely engaged in the inner end 112 of the solenoid body 110 in a gas-tight fit. The plug 178 includes a central axial bore 180 to permit gas to flow between the bore 177 in the solenoid core 170 and the high pressure region 6 of the cylinder 2.

A solenoid coil 182 surrounds the solenoid body 110, retained by a retaining nut or snap ring 184 or other securing means which traps the solenoid coil 182 against the lip 114 of the solenoid body 110. It will be apparent that the low pressure region 8 within the cylinder fitting 100 isolates the solenoid coil 182 from the gas within the cylinder 2. This configuration is therefore preferable since it presents the advantage that conductors 185 may be fed through a bore 131 extending through the main plug 130 to supply power to the solenoid coil 182 without the need for a sealant capable of withstanding the high pressure conditions within the high pressure region 6 of the cylinder 2. It is not essential, however, to isolate the solenoid coil 182 from the gas within the cylinder 2, but the bore 131 will have to be carefully sealed to prevent leakage after the conductors 185 are in place.

The operation of this embodiment of the invention is similar to that of the externally mounted solenoid embodiment described above. When the cylinder 2 is filled, gas is injected through the port 132 and passage 134, and forces the poppet 140 further into the solenoid body 110, permitting gas to flow past the gasket 122, through orifices 143 into the space 141 defined by the poppet body 148, through slots or spaces formed by flat surfaces 171 along the head 172 of the solenoid core 170, and into the opening 179, through bores 177, 180 into the cylinder 2. When filling is complete and the filling pressure is released, the spring 176 forces the solenoid core 170 and poppet 140 axially through the solenoid body 110 to seat the head 142 of the poppet 140 against the gasket 122 and close the valve.

When the engine starter is engaged, the solenoid 182 retracts the solenoid core 170 until the pin 175 engages the edges of the holes 150 in the poppet body 148. The poppet 140 remains seated momentarily as the retraction of the gasket 173 from the bleed port 145 permits gas to bleed through the bleed hole 144 into the bore 134. The pressure differential across the valve quickly reduces sufficiently to enable the solenoid coil 182 to fully retract the solenoid core 170, unseating the poppet 140, and permitting a full flow of gas through passage 134 and out of the port 132.

The path of gas flow in both directions is illustrated by the arrows in FIG. 6.

Figure 7:
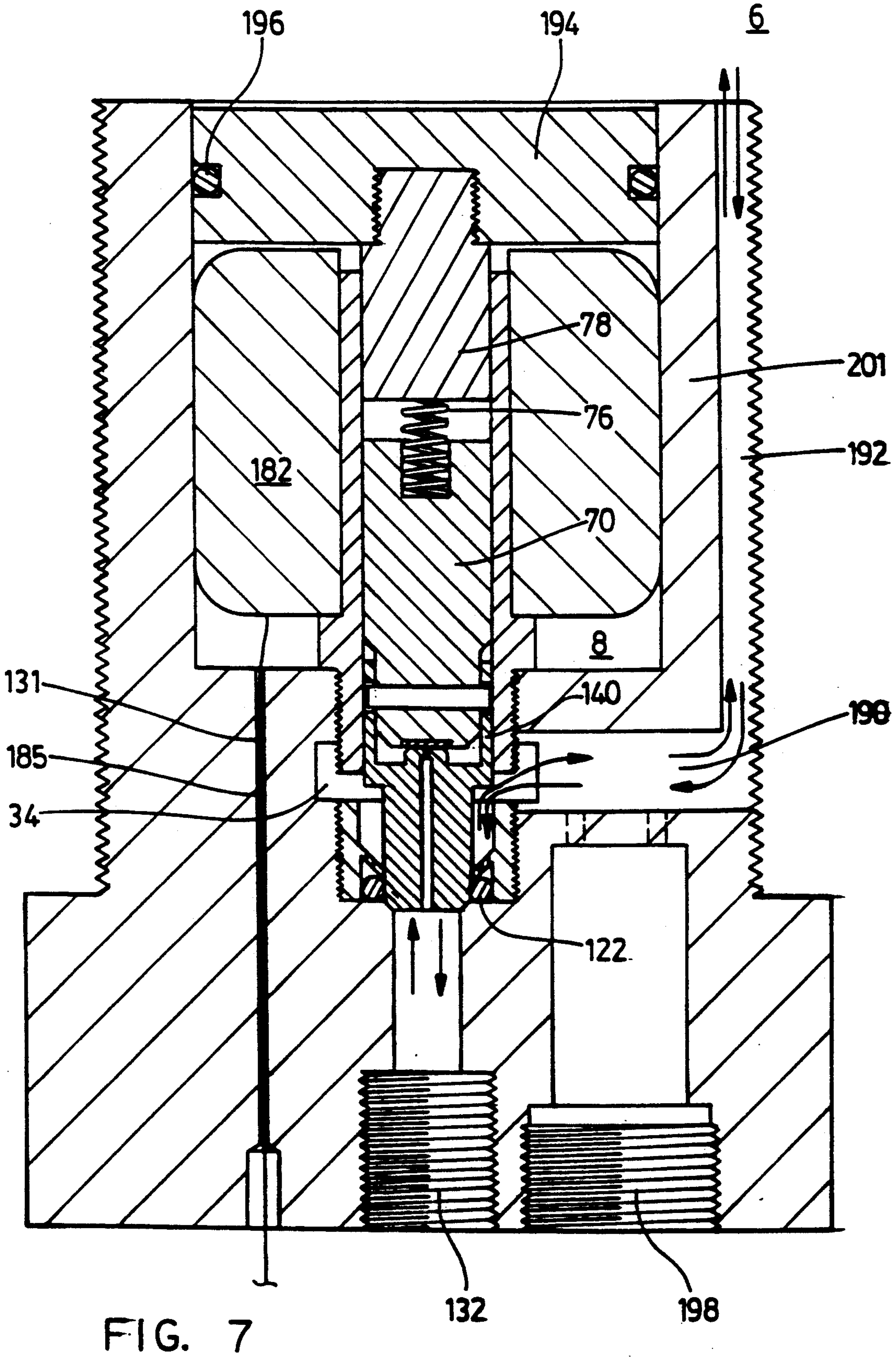
FIG. 7 is a cross-sectional view of a modification of the second embodiment of the present invention.

A modification of the internal solenoid valve is illustrated in FIG. 7, with like numerals designating like components. In this modification, as seen by the arrows illustrating the path of gas flow, a chamber 34 is in communication with the valve cavity 120 and, through a series of evenly spaced radial passages 190 communicating with grooves or slots 192 milled axially along the outer threads of the fitting body 201, is also in communication with the high pressure region 6 in the cylinder 2. In this embodiment, the solenoid core 70 and solenoid plug 78 need not be hollow, since a flow path between the valve cavity 120 and the high pressure region 6 of the cylinder 2 is provided in the fitting body 201 itself. The solenoid plug 78 is seated in a plug 194 provided with a gasket 196 sealing the inner end of the fitting body 201, to isolate the low pressure region 8 from the gas within the cylinder 2. A port 198 for a pressure relief device (not shown) is in communication with one of the radial passageways 190.

In that the plug 194 in this embodiment permits the full cross-sectional area within the fitting body 201 to be accessed from the inner end of the fitting body, to permit assembly of components within the fitting body 201, the fitting body 201 may be formed with an integral outer end provided with the port 132 for the gas line and the port 198 for the pressure release device.

The operation of this embodiment is as described with respect to the embodiment illustrated in FIG. 6 except as follows: during refuelling, gas injected through the port 132 enters the valve cavity 120 and is distributed around the chamber 34 to flow through radial passages 190 and axial slots 192; similarly, when the engine starter is engaged the poppet is retracted as described above permitting gas to flow through the axial slots 192 and radial passages 190 into the chamber 34 and valve cavity 120, from which it flows out the port 132.

It will be recognized that although the present invention provides advantages which are particularly beneficial in the use of natural gas as a fuel for motor vehicles, the cylinder fitting of the present invention may be utilized with a compressed gas cylinder of any type, and is not restricted to natural gas cylinders.

We claim:

1. A cylinder fitting having a valve body comprising a valve cavity, means for connecting the valve body to gas cylinder including a passage in communication with the valve cavity, and means for connecting a gas line in communication with the valve cavity;

a gasket comprising an O-ring engaged against a floor of the valve cavity by an annular flange depending from a collar engaged in the valve cavity, and a solenoid-actuated poppet comprising a rounded or chamfered head cooperating with the gasket to selectively prevent or permit gas to flow between the valve cavity and the gas line, such that the force of gas injected into the gas line to fill the cylinder unseats the poppet while the gasket remains engaged against the floor of the valve cavity by the annular flange.

2. The cylinder fitting defined in claim 1 wherein the annular flange depends from the collar obliquely.

3. The cylinder fitting defined in claim 2 wherein the annular flange includes at least one hole permitting a flow of gas from the cylinder into an annular space defined by a surface of the O-ring, a face of the annular flange and an interior wall portion of the collar, whereby the pressure of gas in the cylinder forces the O-ring against the head of the poppet.

4. The cylinder fitting defined in claim 1 wherein a solenoid core includes a head slidably disposed within a poppet body, the head of the solenoid core having a pin extending into a hole in the poppet body, and means for sealing a bleed hole in communication with the passage, whereby when the solenoid is actuated the head of the solenoid core retracts from the bleed hole, reducing a pressure differential across the valve until the solenoid coil is capable of fully retracting the solenoid core and poppet to fully open the valve.

5. A cylinder fitting for substantially complete insertion into a neck of a gas cylinder having a fitting body having an inner end and an outer end, a main plug sealing the outer end of the fitting body having a valve cavity in communication with a port for connecting a gas line, a solenoid body having an outer end seated in the valve cavity and an inner end engaging an opening in the inner end of the fitting body, a gasket engaged against a floor of the valve cavity, and a solenoid-actuated poppet co-operating with the sealing means to selectively prevent or permit gas to flow between the valve cavity and the gas line, wherein the fitting body, main plug and solenoid body define a low pressure region containing a solenoid coil surrounding the solenoid body, isolated from the gas surrounding the fitting body.

6. The cylinder fitting defined in claim 5 including a solenoid plug engaged to an inner end of the solenoid body and having a bore in communication with a solenoid core and the high pressure region in the cylinder, the solenoid core having a bore in communication with the solenoid plug and the valve cavity, and a compression spring engaged against the solenoid plug biasing the solenoid core to a closed position.

7. The cylinder fitting defined in claim 6 wherein the solenoid core includes a head slidably disposed within a poppet body, the head of the solenoid core having a pin extending into a hole in the poppet body, and means for sealing a bleed hole in communication with the port for connecting a gas line, whereby when the solenoid is actuated the head of the solenoid core retracts from the bleed hole, reducing a pressure differential across the valve until the solenoid coil is capable of fully retracting the solenoid core and poppet to fully open the valve.

8. The cylinder fitting defined in claim 5 in which the gasket comprises an O-ring.

9. The cylinder fitting defined in claim 8 whereby the O-ring is engaged against a floor of the valve cavity by an annular flange depending from an interior wall of the solenoid body.

10. The cylinder fitting defined in claim 9 wherein the annular flange depends obliquely toward the O-ring and includes at least one hole permitting a flow of gas from the cylinder into an annular space defined by a surface of the O-ring, a face of the annular flange and an interior wall portion of the collar, whereby the pressure of gas in the cylinder forces the O-ring against eh head of the poppet.

11. A cylinder fitting having a fitting body having an inner end and an outer end with means for connecting a gas line, a solenoid body having an outer end seated in a valve cavity formed in the outer end of the fitting body, a gas-tight plug sealing the inner end of the fitting body whereby the fitting body and the plug define a low pressure region containing a solenoid coil surrounding the solenoid body, at least one radial passageway extending radially through the fitting body and in communication with the valve cavity and a high pressure region within the cylinder comprising a slot extending axially along exterior threading around the fitting body, a gasket engaged against a floor of the valve cavity by means opposing a force of gas flowing into the gas cylinder in a filling mode, and a solenoid-actuated poppet cooperating with the gasket to selectively prevent or permit gas to flow between the valve cavity and the gas line.

12. The cylinder fitting defined in claim 11 including a plurality of radial passages and axial slots.

13. The cylinder fitting defined in claim 5 including a port for a pressure release device in communication with at least one of the radial passageways.

14. The cylinder fitting defined in claim 11 including a bore through the outer end of the fitting body for the passage of electrical conductors powering the solenoid.

15. A bi-directional valve for a gas cylinder, comprising:

a valve body including a valve cavity, a gasket comprising an O-ring engaged against a floor of the valve cavity by means opposing a force of gas flowing into the gas cylinder in a filling mode comprising an annular flange oriented obliquely toward the O-ring and including at least one hole permitting a flow of gas into an annular space defined by a surface of the O-ring, a face of the annular flange and an interior wall portion of the valve body, a poppet cooperating with the gasket to selectively prevent or permit gas to flow through the valve cavity, comprising a poppet body slidably engaged within the valve body and including a rounded or chamfered head, whereby the pressure of gas in the annular space forces the O-ring against the head of the poppet, and a spring compressively urging the poppet against the gasket, wherein in the filling mode the poppet recedes from the gasket under the force of gas injected into the valve.

* * * * *